(12) United States Patent
Chang

(10) Patent No.: US 8,581,750 B2
(45) Date of Patent: Nov. 12, 2013

(54) DATA INPUT SYSTEM WITH MULTI-DIRECTIONAL POINTING DEVICE

(76) Inventor: Liang-Hsi Chang, Walnut, CA (US)

( * ) Notice: Subject to any disclaimer, the term of this patent is extended or adjusted under 35 U.S.C. 154(b) by 1364 days.

(21) Appl. No.: 11/902,026

(22) Filed: Sep. 18, 2007

(65) Prior Publication Data

US 2009/0073003 A1 Mar. 19, 2009

(51) Int. Cl.
H03K 17/94 (2006.01)
H03M 11/00 (2006.01)

(52) U.S. Cl.
USPC .................................. 341/22; 341/20; 341/23

(58) Field of Classification Search
USPC ................................................. 341/20, 22, 23
See application file for complete search history.

(56) References Cited

U.S. PATENT DOCUMENTS

| | | | | |
|---|---|---|---|---|
| 701,220 A | * | 5/1902 | Boyer et al. ............... | 188/219.6 |
| 5,543,818 A | * | 8/1996 | Scott ........................... | 345/168 |
| 6,525,676 B2 | * | 2/2003 | Kisaichi et al. ............. | 341/22 |
| 6,868,280 B2 | * | 3/2005 | Savolainen et al. ........ | 455/550.1 |
| 6,961,048 B2 | * | 11/2005 | Mitchell ..................... | 345/168 |
| 7,091,954 B2 | * | 8/2006 | Iesaka ......................... | 345/168 |
| 7,171,498 B2 | * | 1/2007 | Tu et al. ...................... | 710/73 |
| 2003/0132915 A1 | * | 7/2003 | Mitchell ..................... | 345/168 |
| 2004/0179663 A1 | * | 9/2004 | Chang ....................... | 379/93.27 |
| 2005/0208983 A1 | * | 9/2005 | Khoo ......................... | 455/575.1 |
| 2006/0050142 A1 | * | 3/2006 | Scott et al. ................. | 348/14.05 |
| 2006/0071908 A1 | * | 4/2006 | Rehbock ..................... | 345/168 |
| 2006/0168539 A1 | * | 7/2006 | Hawkins et al. ............ | 715/780 |
| 2006/0232551 A1 | * | 10/2006 | Matta ......................... | 345/156 |
| 2007/0010211 A1 | * | 1/2007 | Mixon ........................ | 455/90.3 |
| 2007/0192743 A1 | * | 8/2007 | Lee ............................. | 715/828 |
| 2008/0111711 A1 | * | 5/2008 | Scott ........................... | 341/23 |

* cited by examiner

*Primary Examiner* — Hai Phan
*Assistant Examiner* — Amine Benlagsir
(74) *Attorney, Agent, or Firm* — Clement Cheng

(57) ABSTRACT

A data input system is provided which comprises a processor, and a key array coupled to said processor, wherein said key array comprising at least one soft-key, at least one multi-directional pointing key for navigate a cursor and a conventional 3×4 telephone soft-key array for data selections; wherein said at least one soft-key includes a "backspace" key to delete a prior input data, a "space" key to add a space after said prior input data, or a "List/Fix" key to display a list of letter on a display for user to fix or list ambiguous letter/word presented by an input string.

1 Claim, 5 Drawing Sheets

Soft-Keypad design

Figure 1 - Soft-Keypad design
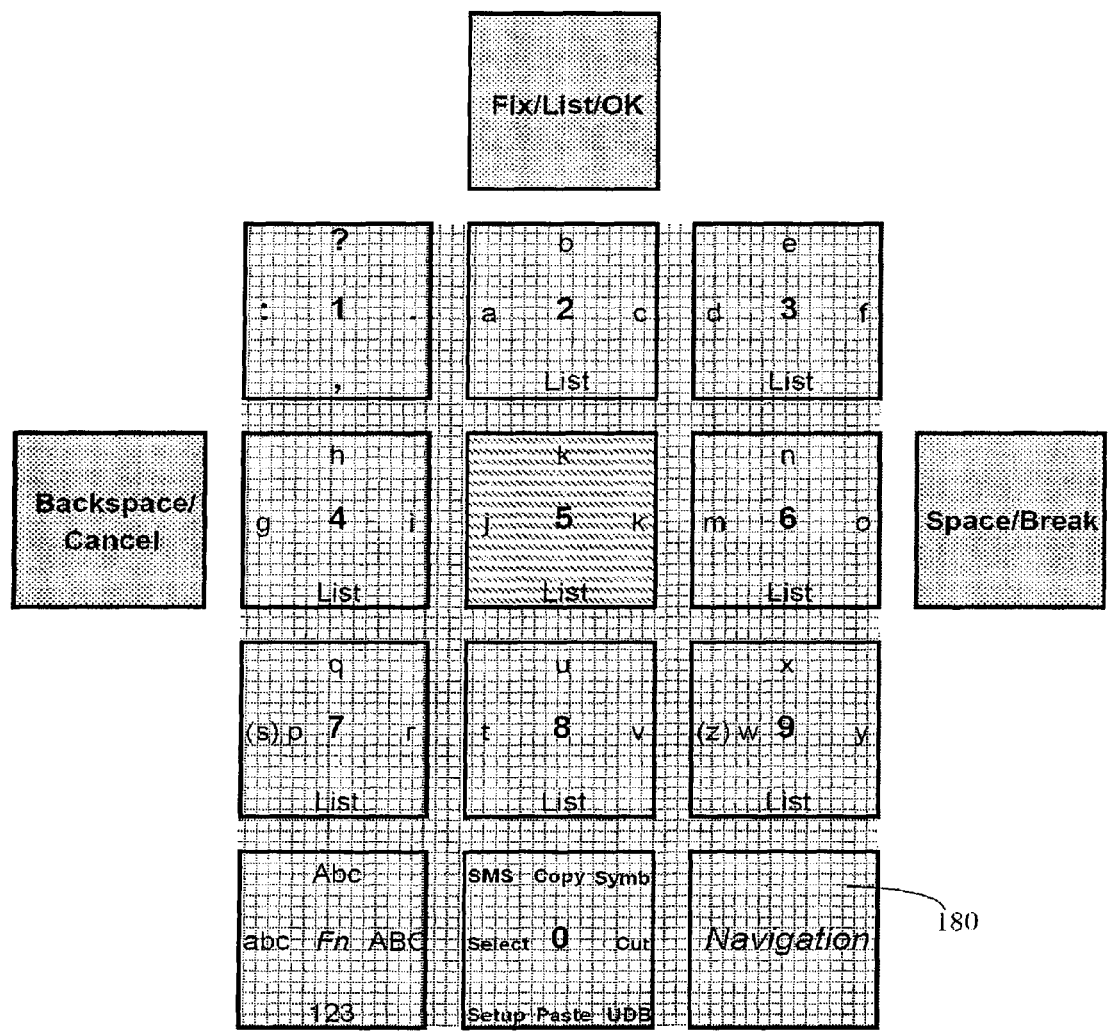

Figure 2 - Navigation Device (Hard Key) ----->
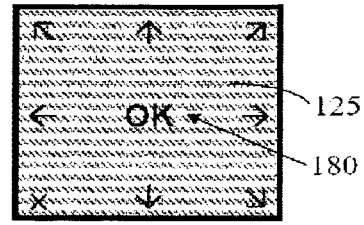
Figure 3 - Navigation Guide Display ----->
(After pressing "Fix" to fix letters)
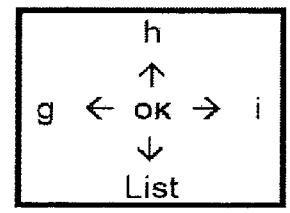

DATA INPUT SYSTEM WITH MULTI-DIRECTIONAL POINTING DEVICE

CROSS-REFERENCE

Disclosure Document of the present invention, entitled "pointing device only input keypad design" filed on Apr. 19, 2006, is incorporated herein for reference.

U.S. Pat. No. 6,320,942, entitled "Directionally-mapped, keyed alpha-numeric data input/output system", filed on Dec. 31, 1998, is incorporated herein for reference.

BACKGROUND OF THE INVENTION

1. Field of the Invention

This invention relates to keypad for data entry, and more particularly, to an input system with multi-directional key for alpha-numerical and functional input.

2. Background

On the present day conventional telephone keypad, there are ten numbered keys, an asterisk key and a pound sign key. The letters of the alphabet are listed in groups of three on eight of the number keys. Entering numerals is performed by simply depressing the indicated keys in turn. However, for entering any given letter (alpha) a special series of key strokes is required, and this method is not generally accepted or understood by the public. There have been many devices invented and available which purport to solve the problem posed by alpha-numeric data entry in a conventional key array, but none have been accepted by the public or manufacturers to date. This has been expressed as being primarily because of their difficulty in use and/or manufacturing.

One prior art mat refer to Kim; Jae-Wook, U.S. Pat. No. 6,897,849 disclosed a key input device for inputting digits/letters/characters/symbols by a keypad and a character input method for the key input device. In the key input device, a mode key is pressed to select one of a plurality of key matrixes for a corresponding mode, which is displayed on a display. A first directional key is used for inter-cell movement in the displayed key matrix and a second directional key is used to select an intended digit/letter/character/symbol within a cell. An intended digit/letter/character/symbol is selected in the cell by pressing a second directional key. The selected digit/letter/character/symbol is displayed on a display. Further prior art is disclosed by Bickerton; Matthew J. in U.S. Pat. No. 6,885,318: it provided a method and device for improved character input, wherein the method employs a keypad comprising keys able to display secondary characters in addition to primary characters. The keypad has a default display state. A first key selection causes the keypad to display secondary characters associated with the first key on other keys, whereupon a second key selection causes the displayed character to be input, following which the keypad reverts to displaying the default state.

The portable device such as mobile phones and similar electronic communication equipment, the space required for adequate data entry with conventional keys presents a continuing problem due to space limitations, and hinders desirable miniaturization of the device. None of the current method discloses a system for data entry that provides for error-free data without complexity, or allows for practical miniaturization of a keypad/keyboard while permitting any desired number of distinct, single key data entries in a simple "hands on" format. Conventional keypad used for telephonic device includes twenty-six letters of the alphabet witch are shown in groupings on eight of the numerical keys. In order to input data, using the conventional keypad, a number of key strokes have to be entered for each letter, plus an extra key stroke when the word is completed. There are a lot of separate key strokes that must be entered in proper sequence in order to enter a desired word on a conventional keypad, it is inconvenient and takes time. It is then, not surprising that this formidable and error-prone way of entering alpha data into telephones is not at all favored by the public. In view of the foregoing, it is clear that there remains a need for a simple, relatively error-free alpha-numeric data entry system for telephonic, as well as for space-constrained computers, miniaturized controllers and the like.

What is required is a data input system with multi-directional pointing device for telephonic device.

SUMMARY OF THE INVENTION

An object of this invention is to provide a system that enhances the functionality of a conventional numeric keypad while retaining simplicity in usage and is economic to produce and practical to install.

Another object is to provide a data input system having a multi-directional pointing device for navigate a cursor on a display.

Further objects and advantages of the invention are to provide a data input system having at least one soft key and functional key located around the outer ring of conventional key array.

The present invention is a directionally-mapped, alpha-numeric data entry system comprising a key array, a microprocessor, a signal (or code) generator, an LCD driver and a display. The key array includes at least one multi-directional pointing device, at least one soft key and a soft-numerical key group.

The present invention discloses a data input system comprising: a processor, and a key array coupled to said processor, wherein said key array comprising at least one soft-key, at least one multi-directional pointing key for navigate a cursor and a plurality of data entry keys for entering data; wherein said at least one soft-key includes a "backspace" key to delete a prior input data, a "space" key to add a space after said prior input data, or a "List/Fix" key to display a list of letter on a display for user to fix or list ambiguous letter/word presented by an input string. The at least one multi-directional pointing key comprises a single membrane pointing device having a plurality of direction indicators disposed thereon. The at least soft key and the at least one multi-directional pointing key are located adjacent to one key of said plurality of data entry keys. The data input system further comprises at least one functional key located at the outer ring of said plurality of data entry keys. A "home location" key is provided to the key array for any input, said cursor always starts from said "home location" of said multi-directional pointing device.

A data input system, comprising: a processor; a multi-directional key module coupled to said processor to navigate a cursor on a display; and a List/Fix key module coupled to said microprocessor to display a list of letter on said display for user to fix or list ambiguous letter/word presented by an input string. A space key is coupled to said processor to add a space after a prior input data; and a backspace key coupled to said processor to delete a prior input data. The multi-directional module includes a multi-directional pointing device defined with multi-directional indicator, each indicator showing a pre-determined direction. The processor is programmed to interpret which of selected data items is being input when a particular data entry key is depressed, based upon an pre-determined direction input into said multi-directional pointing device to convert such interpreted data items into appropriate code for use by a data output device, such that when any particular one of said indicator is actuated, radial direction input data acts together with an actuated data entry key to enter the auxiliary data item which is associated with said data entry key and located in the corresponding radial direction to that indicated by the selected indicator.

A specially programmed processor accepts the keyed input signals and provides digital signals to a code generator for conversion to codes for telecommunication. The processor also provides ASCII codes for computer input and signals to an LCD driver that drives the display. A complete system including the key array, uses only a few components which are readily available, is small in size, low cost and uses little power. It therefore would be readily adaptable and suitable for telecommunication equipment or other common data entry/communication devices.

BRIEF DESCRIPTION OF THE DRAWINGS

FIG. 1 shows an embodiment of a soft-key array with conventional 3×4 phone keypad with the additional soft-keys adjacent to the phone keypad for multi-directional navigations and data inputs according to the present invention;

FIG. 2 shows an embodiment of a navigation hard key according to the present invention;

FIG. 3 is an embodiment illustrating an example of navigation guide display according to the present invention;

DESCRIPTION OF THE PREFERRED EMBODIMENT

The present invention Pointing-Device-Only Input Keypad Design, which uses a Multi-directional pointing device (such as joystick, n-way navigation pad, where n=2,3,4,5, . . . N) to input alpha-numerical & functional input for portable devices (cell phones, Digital Camera, PDA, GPS, Gaming and any devices with a multi-way pointing device). This invention could reference to disclosure document of "Directionally-Mapped, Keyed, Alpha-Numeric Data Input/Output System".

Figure 6:
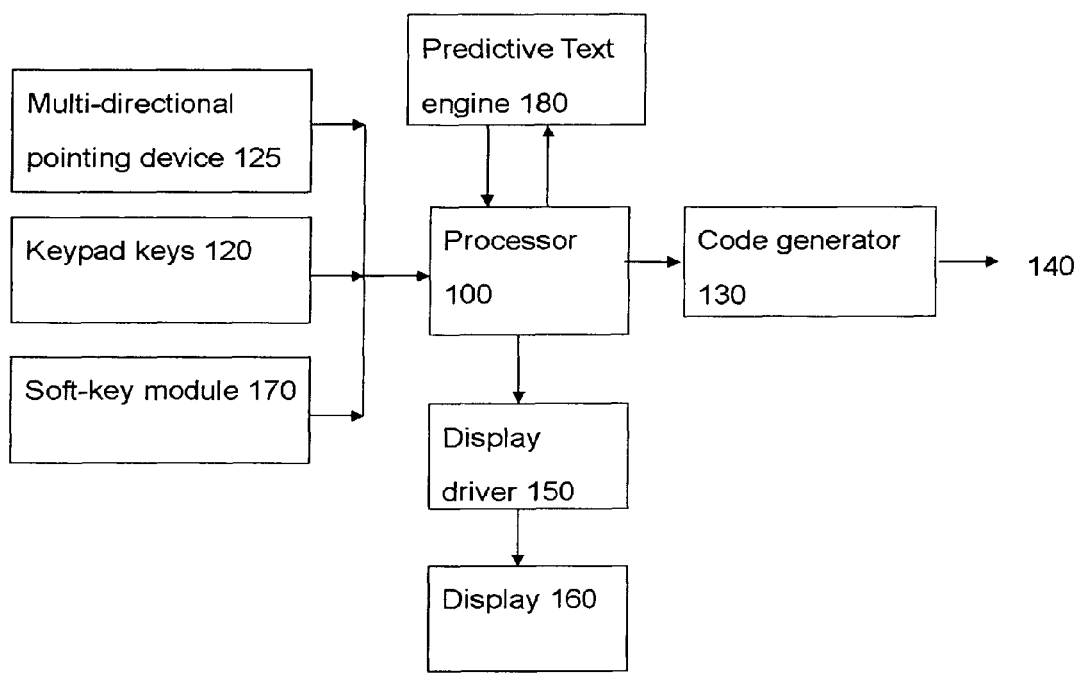
FIG. 6 shows a flow chart of a multi-directional data input system according to the present invention.

Referring now to FIGS. 1 and 6, a block diagram of a multi-directional data input system and the entry key array according to the present invention are illustrated. The system comprises: a micro-processor 100, at least one multi-directional pointing key (device) 125 to navigate cursor over the keypad array, a keypad keys 120 that provide data input signals to the micro-processor 100, a code generator 130 which converts signals from the micro-processor into codes 140 for data communication use, a display driver 150 supplied by signals from the micro-processor 100 and a display 160 driven by the display driver 150. A soft-key module 170 is coupled to the processor 100, the soft key module maybe include a "List/Fix" OSD (On-Screen-Display) device or navigation guide display generator for generating the navigator display (FIG. 1) on the screen or display 160. A backspace and space soft-keys and the detailed will be described later. A navigation pointer 125 is also coupled to the micro-processor 100.

The key array is shown in FIG. 1, is an example of a key array for data input. The numerical keys of which are shown, it maybe the same as conventional numerical keys. At least one multi-directional pointing device (key) 125 is shown at the key array, on a membrane circuit surface 125, as shown in FIG. 2. It is noted, for clarity, that the term "multi-directional pointing device or key", in the preferred embodiment, could be separate "keys", or "portions" of the single membrane circuit surface 125. The multi-directions, for instance, n-way directions may be indicated by inscribed arrows, which are touched when required. To enter any one data item other than the conventional keypad numerals, it is only necessary to first touch the multi-way pointing device or key arrow on the membrane 125, corresponding to the position of the data on the key.

Figure 4:
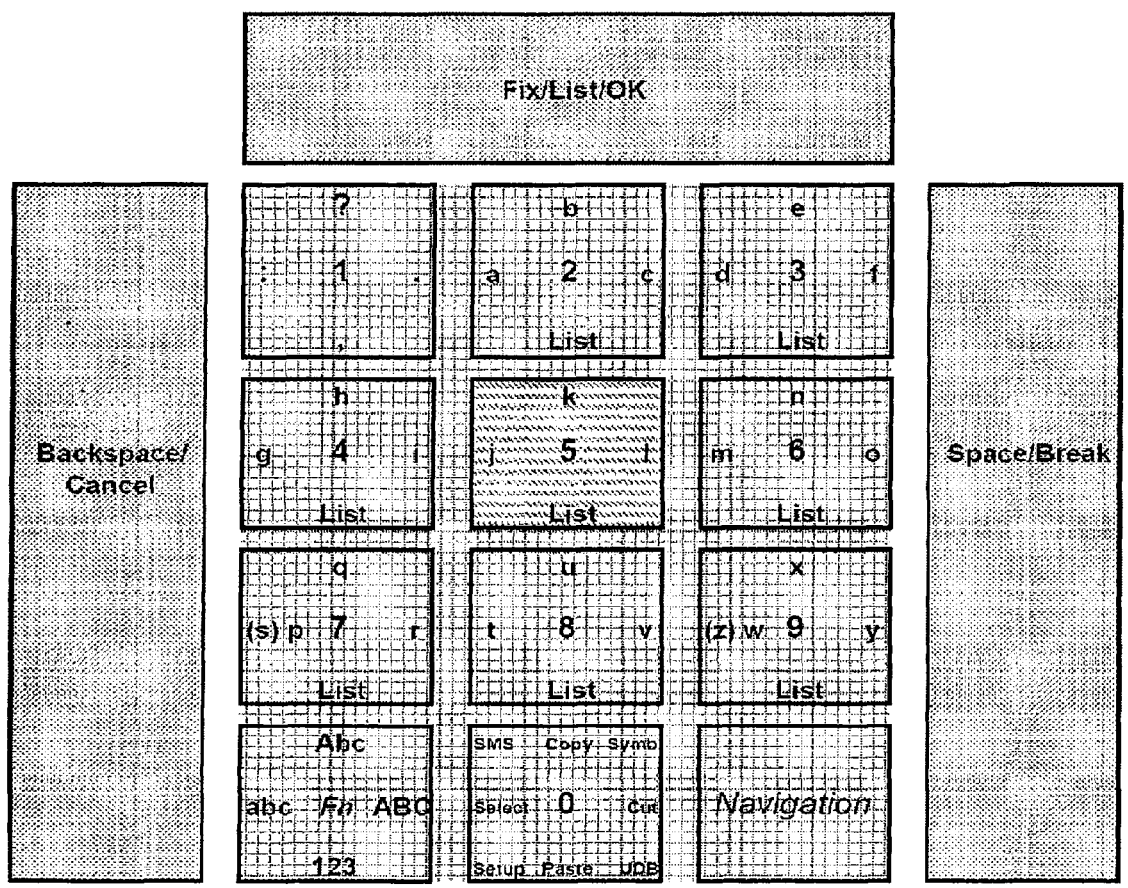
FIG. 4 shows an alternative embodiment of a soft-key array with conventional 3×4 phone keypad with the additional soft-keys adjacent to the phone keypad for multi-directional navigations and data inputs according to the present invention.
Figure 5:
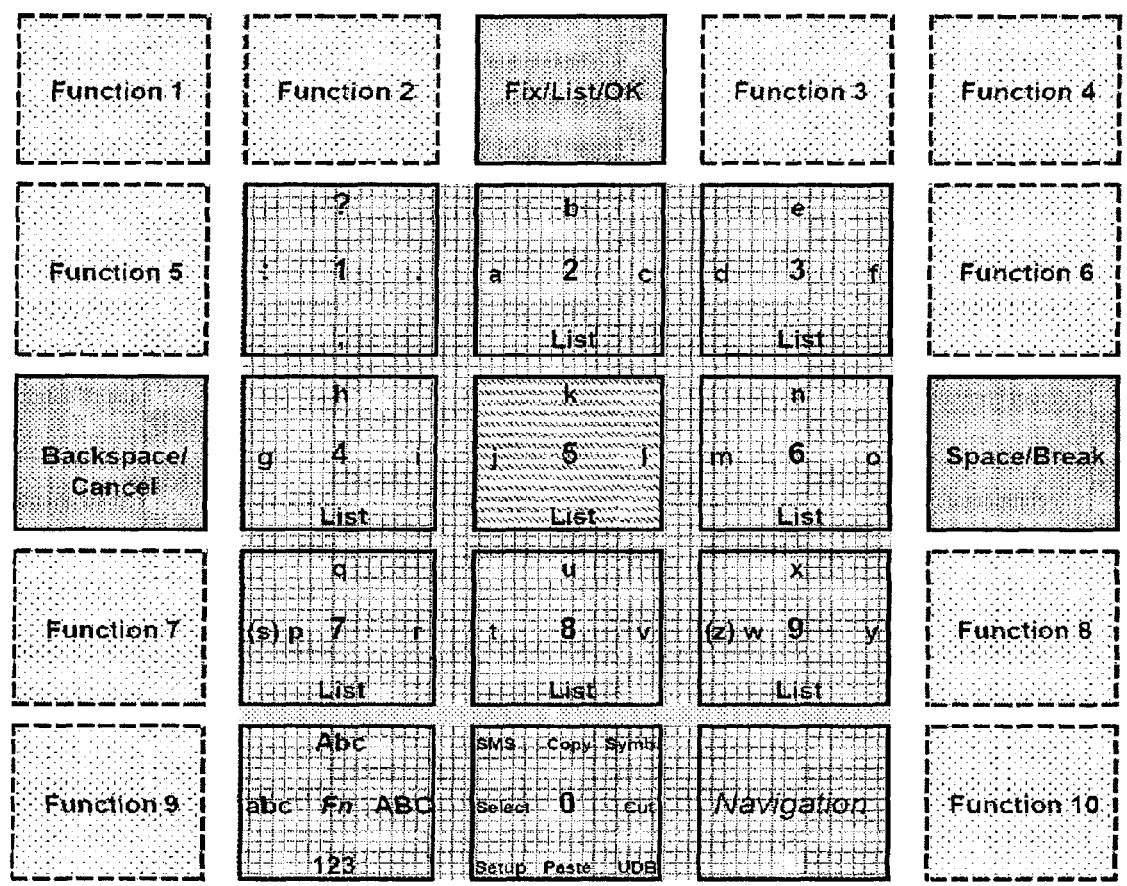
FIG. 5 shows an alternative embodiment of a soft-key array with conventional 3×4 phone keypad with the additional soft-keys adjacent to the phone keypad for multi-directional navigations and data inputs according to the present invention.

The present invention includes pluralities of soft keys configured around the standard telephone keypad array, for example, 3-column×4-row design, as shown in FIG. 1. In one preferred embodiment, the present invention includes "backspace/cancel" key arranged adjacent to the key "#4", a "Fix/List/" key is located adjacent to the key "#2" and a "space/break" key is arranged adjacent to the key "#6". It is appreciated that the example is used for illustrating rather than limiting the scope of the present invention. These added keys are driven by soft key module 170 and their functions are activated automatically (or by confirmation) once the Navigation pointer (FIG. 2) is moved to that location. It activates "Backspace/Cancel", "List/Fix" & "Space/Break" respectively. The functions of the soft keys are: "Backspace/Cancel"—Delete the prior input data (or cancel the prior function); "List/Fix"—Display a list of letters (or functions) for users to fix (as shown in FIG. 3) or List other ambiguous letters/word represented by the input strings; The "List/Fix" OSD (On-Screen-Display) is activated as demanded by user (Fix-On-Demand). The auxiliary data of the prior-pressed key will be displayed for user selection. Please note that the auxiliary data can be layout in any forms, radially list or in a straight line list with number assigned to each letter/functions and so on; "Space/Break"—Add a "Space (or Break)" after the prior input data. The Pointing-Device input system may be integrated with a Predictive Text engine/data 180 coupled to the processor 100 to simplify input and predict words based on the numerical input strings entered. Alternative Soft-Keypad Design in FIGS. 4 and 5 are provided to have additional functions (function 1, function 2 . . . function 10). These additional function keys are also activated automatically (or by confirmation) once the Navigating pointer is moved to the key locations. The soft-keys and functional keys are configured at the outer ring of the key array.

OPERATION EXAMPLE

Preferably, for any input, the Navigation cursor always starts from key "#5" as the "Home-location" of the multi-way point device. If the user would like to input a word "good", the user needs to input numerical string of: "4 6 6 3" by moving from Home-location of key "#5" each time (Cursor returns to Home-location of "#5" after OK is pressed) to:

Left to "4" and press Center/OK;
Right to "6" and press Center/OK;
Right to "6" and press Center/OK;
Right and UP to "3" and press Center/OK.

The users can activate the Fix/List function from Home-location of "5" by:

a. "UP", "UP" and "DOWN" to "List" the ambiguous words represented by the input string: "4 6 6 3"

It will have list of ambiguous words of:

4663, home, good, gone, hood (Words match the exact length of the string input);

homework, homeland, . . . (Word completion candidates following the highlighted word) or b. the users can fix any letters from the prior Numerical input by:

Left to "4" and press Center/OK;
UP, UP and UP, and press Center/OK to fix letter "h" from the displayed guide ("g", "h" or "i" in FIG. 4)
Right to "6" and press Center/OK;
Right to "6" and press Center/OK;
Right and UP to "3" and press Center/OK.

It will have list of ambiguous words of:

h663 home hood . . . (Words match the exact length of the string input)

homework homeland . . . (Word completion candidates following the highlighted word)

The advantages of this invention are:

a. Blind-type-able—Many users can memorize the layout of a standard telephone keypad array (3-column×4-Row design). Moving the navigation cursor from the home location of 5 to the keys of 1, 2, 3, 4, 5, 6, 7, 8, 9, 0, * & # is countable in mind.

b. Activation (Automatically or with a press of Center/OK) of functions on the 3 added soft-key areas is very convenient and effective.

c. The relative position on each of the 3 added soft-key areas is intuitive for data entries.

It should be noted that there could be any convenient number of keys in an array and any number of multi-directional pointing device keys. The maximum number of data items inscribed around a given key depends primarily on the space provided around the key for printing the data items intelligibly. In the example array shown in FIG. 5, there are three soft keys, ten functional keys configured around the edges of the conventional keypad. The additional function keys may active the TV, camera, GPS and others. Any arrangement of the multi-directional pointing key is permissible, and this permits location flexibility helpful in designing data entry key arrays for miniaturized control panels or keypads.

The selection of the number of keys, data entry type and number of entries, depends entirely on device application. For a standard telephone entry pad, the number of keys could remain as twelve numerical, with twenty-six alpha data items (A to Z) added. The application of the invention system to space constrained communication devices, is facilitated by an ability to design for a much smaller number of keys than otherwise would be required. In particular, it is believed that the present invention system could be used to great advantage for space constrained devices such as remote controllers, electronic organizers, calculators, computers, games and various control panels. There is also great flexibility in the type of keys that could be used. These keys could be any currently available types such as conductive, rubber or membrane circuitry.

From the foregoing description, it is believed that the preferred embodiment achieves the objects of the present invention. Various modifications and changes made be made in the system described above which are apparent to those skilled in the art. These alternatives and modifications are considered to be within the scope of the appended claims and are embraced thereby.

What is claimed is:

1. A data input system comprising:
   a. a processor;
   b. a multidirectional pointing device comprising:
      i. at least four directions, namely an up direction, a down direction, a left direction and a right direction, wherein the multidirectional pointing device sends data input signals to the processor; and
      ii. an ok button;
   c. a key array coupled to the processor that is configured as a 3×4 telephone keypad layout, wherein the key array includes:
      i. a cursor that goes from key to key on the 3×4 telephone keypad layout when a user presses the multidirectional pointing device, wherein the cursor moves up when the multi-directional pointing device is directed up, wherein the cursor moves down when the multidirectional pointing device is directed down, wherein the cursor moves left when the multidirectional pointing device is directed to the left and wherein the cursor moves right when the multidirectional pointing device is directed to the right;
      ii. a plurality of keys including: key #1, key #2, key#3, key#4, key#5, key #6, key#7, key#8, key #9, key #0, wherein the cursor activates one of the plurality of keys when the user presses the ok button while the cursor is on one of the plurality of keys; and
      iii. a cursor home location on the on the 3×4 telephone keypad layout that the cursor goes to after a user inputs a character;
      iv. at least three functional keys located at an outer ring of the 3×4 telephone keypad layout comprising:
         1. a backspace key to delete a prior input data arranged adjacent to the key #4 of the 3×4 telephone keypad layout;
         2. a space key to add a space, wherein the space key is adjacent to the key #6 of the 3×4 telephone keypad layout;
         3. a list key to display a list of possible words, wherein the list key for displaying a list of possible words is located adjacent to the key "#2" of the 3×4 telephone keypad layout;
   d. a code generator configured to convert signals from the processor into codes for data communication use, wherein the code generator and processor are configured with the following parameters:
      i. the cursor home location is key #5 which is between key #4 and key #6;
      ii. the backspace key is automatically activated when the cursor goes to the backspace key;
      iii. the space key is automatically activated when the cursor goes to the space key;
      iv. the list key is automatically activated when the cursor travels to the list key;
   e. whereby a user can physically manipulate the multidirectional pointing device to move the cursor from key to key on the 3×4 telephone keypad layout;
   f. a predictive text software and language database for converting numerical strings to dictionary-based texts;
   g. a display for displaying the 3×4 telephone keypad layout, wherein the outer ring forms a 5×5 keypad layout around the 3×4 telephone keypad layout, wherein the outer ring is automatically activated when the cursor travels to the outer ring.

* * * * *